United States Patent [19]

Maczuga et al.

[11] 4,354,986
[45] Oct. 19, 1982

[54] PROCESS FOR MANUFACTURING BORON NITRIDE FIBER MATS USING A NEEDLER

[75] Inventors: Jacob W. Maczuga, Amherst, N.Y.; Daniel C. Wilhelm, Waltham, Mass.

[73] Assignee: Kennecott Corporation, Stamford, Conn.

[21] Appl. No.: 156,332

[22] Filed: Jun. 4, 1980

Related U.S. Application Data

[63] Continuation-in-part of Ser. No. 134,904, Mar. 28, 1980, abandoned.

[51] Int. Cl.³ .............................................. B29C 6/00
[52] U.S. Cl. ........................................ 264/8; 264/57; 264/65; 264/248; 264/518; 264/DIG. 19; 423/290
[58] Field of Search ................. 106/55, 39.5; 423/290; 264/DIG. 19, 518, 57, 82, 8, 65, 248, 324, 332

[56] References Cited

U.S. PATENT DOCUMENTS

| | | | |
|---|---|---|---|
| 3,429,722 | 2/1969 | Economy et al. | 106/65 |
| 3,620,780 | 11/1971 | Economy et al. | 106/65 |
| 3,630,766 | 12/1971 | Economy et al. | 106/65 |
| 3,668,059 | 6/1972 | Economy et al. | 106/39.5 |
| 3,971,669 | 7/1976 | Wrzesien et al. | 428/367 |
| 4,032,607 | 6/1977 | Schulz | 264/29.3 |
| 4,075,276 | 2/1978 | Economy et al. | 264/171 |
| 4,130,631 | 12/1978 | Hamilton | 106/39.5 |

FOREIGN PATENT DOCUMENTS 50-120499 9/1975 Japan ................................. 423/290

*Primary Examiner*—Jay H. Woo
*Attorney, Agent, or Firm*—Anthony M. Lorusso; R. Lawrence Sahr

[57] ABSTRACT

A process is disclosed for producing a non-woven, boron nitride fiber mat, suitable for use as an electric cell separator in a lithium-sulfide battery. Molten boron oxide is centrifugally spun into strands and attenuated by an annular gas stream into fibers which are compacted at a controlled relative humidity into a mat. The mat of fibers passes through a needler, which repeatedly drives arrays of needles into the mat from either one or both sides, to reorient and intertwine the fibers, producing additional mechanical bonds thereamong. The needled mat then is heated in an anhydrous ammonia atmosphere to convert boron oxide in the fibers into boron nitride (BN). In an alternate embodiment the boron oxide fibers within the mat are converted into boron nitride before being passed through the needler.

12 Claims, 3 Drawing Figures

PROCESS FOR MANUFACTURING BORON NITRIDE FIBER MATS USING A NEEDLER

This application is a continuation-in-part of copending U.S. application Ser. No. 134,904, filed Mar. 28, 1980, now abandoned, by the same applicants as the present application.

BACKGROUND OF THE INVENTION

The invention relates generally to boron nitride fibers and more particularly to a process for producing integral boron nitride fiber mats.

Boron nitride (BN) possesses a number of highly desirable properties which render it useful in a wide variety of applications. Its high electrical resistivity, coupled with its high thermal conductivity, make it especially useful in electrical and electronic applications requiring a material which simultaneously acts as an electrical insulator and a thermal conductor. Its excellent thermal shock resistance renders it effective as a refractory at temperatures up to 1600° C. or higher in a non-oxidizing atmosphere and at temperatures as high as 700° to 900° C. in air. It is highly corrosion resistant, being inert to most organic liquids and many corrosive chemicals and displaying excellent resistance to attack by various molten metals. Furthermore, because of its low dissipation factor over a wide temperature range, this material is well suited for use in microwave and radar dielectric components (radar windows).

Various methods for the manufacture of boron nitride fibers are known in the prior art; for example, it is disclosed in U.S. Pat. No. 3,429,722, issued to James Economy et al., that boron nitride fibers can be manufactured by heating boron oxide fibers in an ammonia atmosphere, a process known generally as nitriding.

While it is well known in the prior art that boron nitride fibers can be manufactured having good characteristics, the use of such fibers has been limited due to difficulties in forming three dimensional articles from the fibers. U.S. Pat. No. 3,816,242 to Selover et al. teaches a process for binding BN fibers into a felt using an aqueous solution of an inorganic, water soluble material as the binder. However, almost any substance other than BN which is used to bond the fibers to each other has properties which are inferior to the properties of the boron nitride fibers, thus resulting in a bonded article which is unsuitable for use in many applications. For example, when a boron nitride fiber mat, which is bound by prior art materials, is used as an electric cell separator in a lithium sulfide battery utilizing a corrosive cell electrolyte, such as molten lithium chloride or potassium chloride, the fibers separate from each other due to the inability of the binding material to withstand the high temperature corrosive environment.

An attempt has been made prior to the present invention to form articles from boron nitride-bonded boron nitride fibers, for example, by heating boron nitride fibers impregnated with boric acid solution to elevated temperatures in ammonia as disclosed in U.S. Pat. No. 3,837,997 to James Economy et al.

In addition to the above-noted references relating to boron nitride fibers, shaped boron nitride, usually non-porous, bodies have also been prepared in the past. Such articles are disclosed, for example, by Taylor, U.S. Pat. No. 2,888,325, which teaches the use of a multiple stage nitriding process comprising intermittent addition of oxygen containing boron compound at intermediate stages of nitriding, followed by further nitriding.

Furthermore, such articles have been prepared by sintering boron nitride fibers in the presence of boron oxide.

U.S. Pat. No. 4,130,631, assigned to the same assignee as the present application, does disclose a method for producing a non-woven porous boron nitride fiber mat having sufficient strength for use as an electric cell separator in the above mentioned molten lithium chloride environment. However, despite the superior physical characteristics of the resulting product, this method is not sufficiently detailed to insure an economically feasible operation.

Therefore, it is an object of the present invention to provide a totally integrated manufacturing process to produce boron nitride fiber mats starting from the basic boron oxide, and to do so in a commercially feasible manner.

SUMMARY OF THE INVENTION

A process for producing a non-woven, mechanically intertwined boron nitride fiber mat, suitable for use as an electric cell separator in a lithium-sulfide battery, comprises the steps of centrifugally spinning molten boron oxide into strands and attenuating the strands with an annular gas stream into fibers. The fibers are compacted into a mat and then passed through a needler to reorient and intertwine the fibers to create a more integral mat. Finally the mat is heated in an anhydrous ammonia atmosphere at a sufficient temperature and for a sufficient time to convert the fibers into boron nitride.

Alternatively, a satisfactory mat also is obtained by converting the boron oxide fibers into boron nitride before passing them through the needler.

BRIEF DESCRIPTION OF THE DRAWINGS

The several features and advantages of this process for manufacturing boron nitride fiber mats in accordance with the invention, will be more readily understood and appreciated from the following detailed description of the preferred embodiments, as shown in the accompanying drawings in which.

DESCRIPTION OF THE PREFERRED EMBODIMENT

Figure 1:
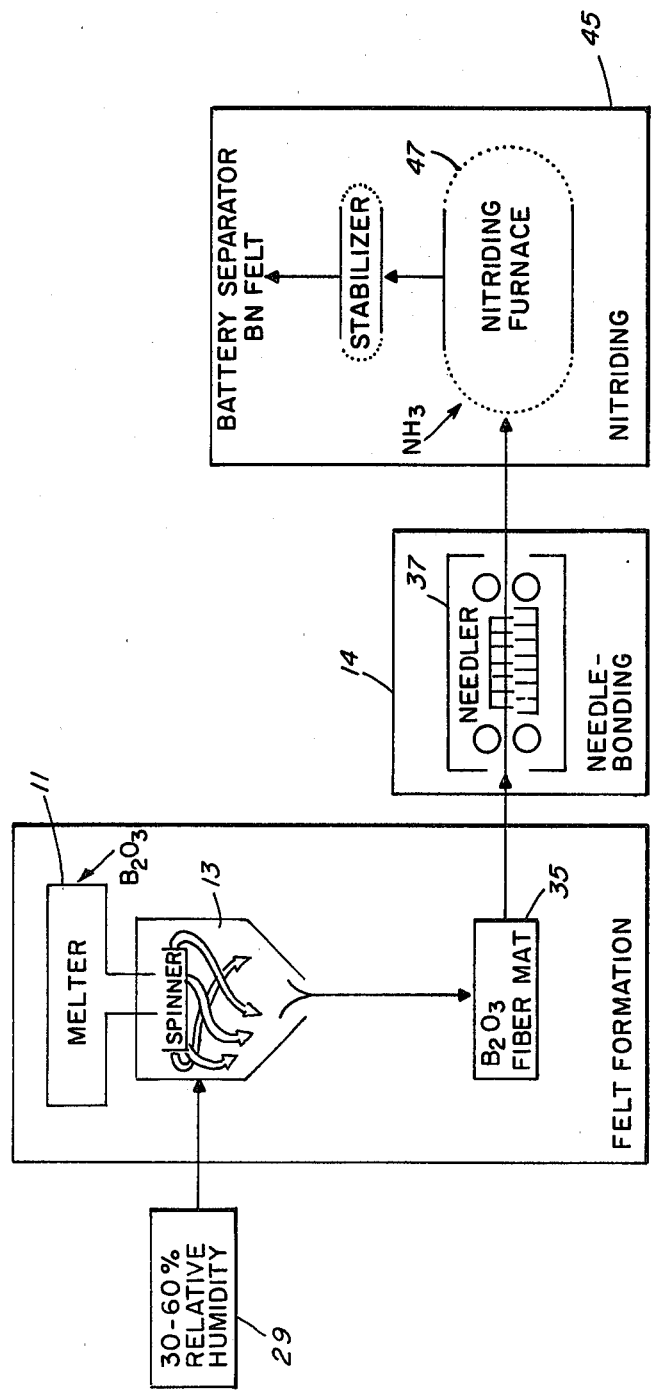
FIG. 1 is a flow diagram of the boron nitride manufacturing process in accordance with the present invention.
Figure 2:
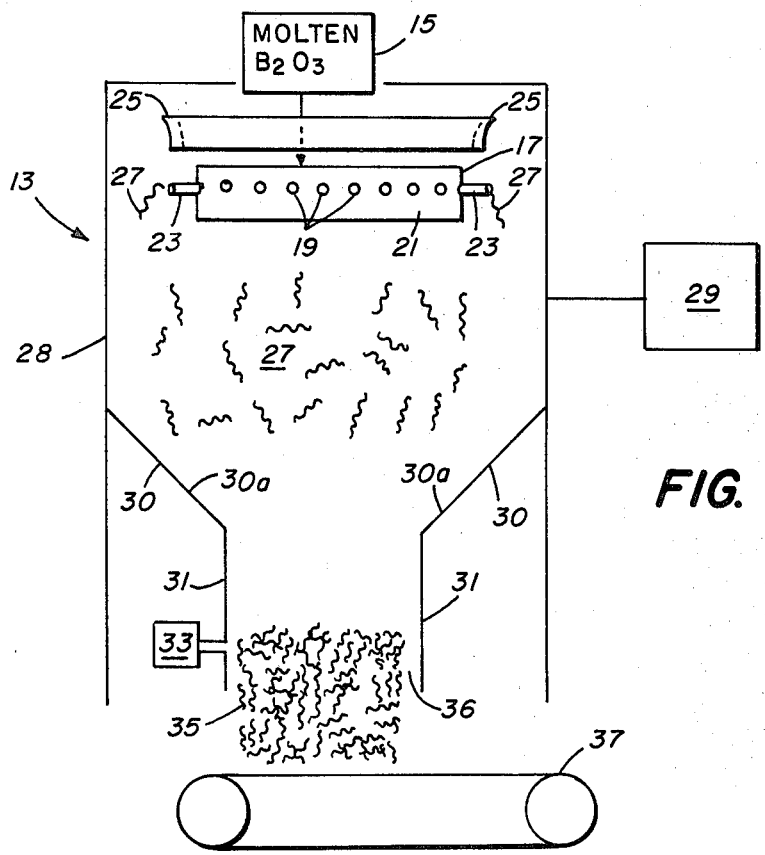
FIG. 2 is a side elevation view, in diagrammatic form, of the boron oxide centrifugal spinning apparatus used to produce boron oxide fibers.

Referring now to FIG. 1, the starting point in the boron nitride manufacturing process is the production of the basic boron oxide fibers utilizing a melter 11 and a spinner apparatus 13. The melter, as its name indicates, raises the temperatue of solid boron oxide ($B_2O_3$) crystals above their 460° C. melting point, using any convenient means, and turns them into a molten liquid. The melter generally heats the $B_2O_3$ crystals to a temperature in the range of 600°–1100° C. Referring now to FIG. 2, the molten boron oxide liquid 15 is introduced into a cylindrical drum 17 having a series of orifices 19 arranged at generally equal spacings about the circumference of a vertically extending sidewall 21. A drive motor (not shown) spins the drum containing the molten boron oxide at a high speed (1000–3000 RPM), thereby forcing the molten boron oxide centrifugally outwardly, against the inner surface of the sidewall 21 and through the orifices 19. This action produces a series of extruded strands or primary elements 23. An annular orifice 25 with a diameter one inch greater than the drum 17 diameter is disposed about the periphery of the rotating drum 17, generally perpendicular to the direction of extrusion of the strands. A stream of gas, for example, an inert gas, compressed air, or combustion gases emanates from the annular orifice 25 at a temperature in excess of about 700° C. and at a rate of approximately 800 to 900 feet per second, and impinges obliquely on the outward end of the opposing strands 23. The action of the annular gas stream induces a downward velocity and produces an attenuating effect, which thins each of the strands into a fiber or filament 27. This procedure is analogous to processes known in the fiber glass manufacturing art, using apparatus such as those disclosed in U.S. Pat. Nos. 3,014,236 and 3,030,659. Although the proper combination of operating variables such as, for example, rotational speed of the drum and the temperature and rate of gas flow from the annular orifice 25 could produce one continuous boron oxide fiber 27 from each of the strands 23, because of the inherent brittleness of the boron oxide the stream typically produces staple or discretely formed fibers, generally ranging from about 0.1 inch to 1.0 foot in length. Preferably the maximum diameter of the fibers is targeted to be about 10 microns, with 3–7 microns being the optimum diameter.

An outer housing 28 of the spinner creates a more or less isolated environment in which the extruding and attenuating operations take place. A humidity controller 29 maintains this environment at a relative humidity of about 30–70%, an amount which does not significantly deteriorate the water-soluble boron oxide.

The mass of spun-off fibers 27 falls into the space encompassed by a receptacle 30 whose sloping sides 30a gradually funnel the mass into a chamber 31. An air transvector 33 communicates with the interior of the chamber 31. This transvector provides a high velocity (100–200 feet/second) stream of air which prevents the fibers from wrapping together to form a "rope". The stream creates a turbulence which violently swirls the fibers producing multiple collisions and points of contact thereamong, resulting in random fiber orientation and an even distribution of the fibers on a collecting screen 37. The density of the compacted fiber mass, or mat 35 as it exits from a discharge port 36 of the spinner, is typically in the range of from about 0.001 to 0.004 grams per cubic centimeter. The moving collecting screen 37, positioned beneath the discharge port 36, receives the fibers and forms a continuous mat. Alternatively, the mats may fall onto a continuously moving conveyor belt. In either case, the function of the screen or the conveyor is to transport the mats to the location of the next step in the process.

Referring again to FIG. 1, the next step in the process in accordance with the present invention, is the needle-bonding of the boron oxide fiber mats to enhance their internal cohesiveness, indicated generally by reference numeral 14.

Figure 3:
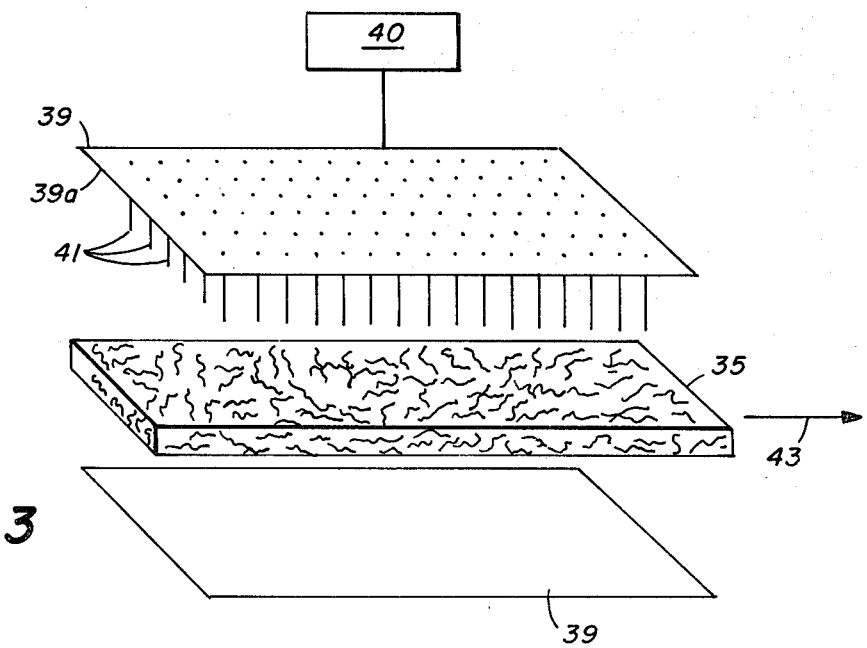
FIG. 3 is a side perspective view, in diagrammatic form, of the needler with a boron oxide mat engaged therein.

Upon emergence from the spinning apparatus 13 the generally amorphous mats 35 of boron oxide fibers have some internal cohesiveness due to random mechanical bonds among the fibers. However, this internal cohesiveness may not be sufficient for the mats to maintain their integrity when subjected to repeated handling, or to particularly severe environments. In order to enhance the internal bond structure of the mats, they are passed through a needler 37, a device known to the non-woven fabric-producing art. Representative examples of devices are disclosed in U.S. Pat. Nos. 2,902,746 and 3,538,564. Referring now to FIG. 3, the needler consists of an opposing pair of generally parallel plates 39, one of which has an array of transversely oriented needles 41 of uniform length protruding from its inner surface 39a. Alternatively, both plates 39 may be provided with such an array of needles. Typically, the size of the needles is 16 gauge (AWG) or smaller, and the spacing between needles is in the range of 0.01 to 1 inch. In the case when both plates have needles, the needles on each plate are staggered relative to the needles on the opposite plate so that each needle is not directly opposed by a needle on the opposite plate. In other words, when the plates approach one another, the needles on one plate will fit within the spaces among the needles on the opposite plate in an interdigitated configuration.

During operation a drive motor 40 separates the plates 39 from each other a sufficient interval to allow a mat 35 of fibers to be placed therebetween. The drive motor 40 then brings the plates 39 together as closely as possible, as limited by the lengths of the needles 41. The needles penetrate into the interior of the mats and impinge upon the individual fibers therein.

As the needles pass through the mat, they mechanically interlock the randomly oriented fibers and redirect a portion of them in a direction parallel to the needles and across the thickness of the mat. When the plates separate to disengage from the mat, restraining devices (not shown) prevent the mat from following the plates. The operation is repeated several times with the mat being repositioned slightly within the needler, in a direction indicated by an arrow 43, between successive engagements of the needles. The penetration of the needles into the mat eventually aligns enough of the fibers in the same crosswise direction to produce significant internal cohesiveness in the mats. The needling operation also performs a shaping function, as the outer surfaces of the mats gradually assume a more or less planar contour and the mat takes on a more mat-like appearance.

The following illustrative example is offerred to aid in understanding the function of the needling apparatus. A mat of fibers is placed between the two needler plates, only one of which plates has an array of needles thereon. The needles are 36 gauge (AWG) and are arranged in rows extending in the direction of travel of the mat, at a density of 77 needles per linear inch. Each row is separated by one-half inch. The needles completely penetrate the mat and then withdraw, the mat is advanced forwardly by 0.22 inch, and the needles penetrate again. This operation is continued until the entire mat has passed through the needler. This needler achieves an increase in mat density of from 300–400%.

The final stage in the process according to this embodiment of the present invention is the nitriding and stabilizing of the needled mat, indicated in FIG. 1 by reference numeral 45.

Nitriding involves the heating of the mat of boron oxide fibers in a nitriding furnace 47 in an ammonia ($NH_3$) atmosphere, which is free of water vapor. This exposure of the boron oxide to the ammonia atmosphere produces a reaction according to the general equation: $B_2O_3 + 2NH_3 = 2BN + 3H_2O$. As disclosed in more detail in U.S. Pat. No. 3,429,722 to Economy et al. (having a common assignee as the present application, and which is incorporated here by reference), the temperature of the boron oxide is raised from room temperature to a final temperature between about 700° to 1100° C. at a rate of from 5° to 100° C. per hour. The flow of ammonia through the reaction chamber is maintained at 0.01 to 3.3 liter/min/gram of $B_2O_3$ fiber being reacted. Nitriding time may range between 10 hours to 100 hours. As the temperature increases, two intermediate stages of reaction occur. The first reaction which occurs is that of adding a protective shield of a nitrogen and hydrogen containing composition to the outer surface of the $B_2O_3$ fiber. This shield not only retains the fibrous form, but also prevents fusing of the fibers together. Such addition reaction extends from room temperature up to about 250°–300° C. Above about 300° C. and up to about 500° C. the $B_2O_3$ fiber, if having a maximum diameter of not more than about 10 microns, develops a highly porous structure, accompanied by a weight loss and the giving off of water vapor according to the aforesaid general equation. Thus, the $NH_3$ is able to penetrate substantially throughout the thickness of the $B_2O_3$ fiber, allowing the boron, nitrogen, hydrogen and oxygen to react, and begin the formation of various intermediate boron and nitrogen-containing compositions. The exact method by which the nitriding is effected is not critical to the present invention, and various alternative methods previously known in the art may yield equally satisfactory results for the present process.

For stabilization purposes, and to enhance the corrosion resistance of the finished mat, as disclosed more fully in the above referenced '722 patent, the fully nitrided mat can be heated in an inert atmosphere at a temperature which may be below, but which is usually above, the final nitriding temperature. Upon completion of stabilization, the nitride-bonded felt can be cut into shapes and sizes appropriate for the applications in which they will be used, for example, as battery cell separator felts in lithium sulfide batteries.

Alternatively, suitable BN fiber mats can be made by nitriding and stabilizing the boron oxide fibers upon their emergence from the spinning apparatus, and then passing the compacted mass of BN fibers through the needler. In fact, the needler can operate satisfactorily on a mass of BN fibers produced by any of a variety of conventionally known boron nitride fiber fabrication processes, such as, for example, that disclosed in U.S. Pat. No. 3,429,722.

Although the foregoing disclosure illustrates the advantages and features of the novel manufacturing process in accordance with the present invention, it may be obvious to those skilled in the art to effect various modifications or changes to the present invention, without departing from the spirit thereof. The scope of the present invention is to be determined by the following claims.

We claim:

1. A process for producing a non-woven, mechanically intertwined boron nitride fiber mat, comprising the steps of:
   centrifugally spinning molten boron oxide into strands;
   attenuating said strands with a gas stream into fibers;
   compacting said fibers into a mat;
   passing said mat through a needler to reorient and intertwine the fibers; and
   heating said mat in an anhydrous ammonia atmosphere at a sufficient temperature and for a sufficient time to convert boron oxide in the fibers into boron nitride.

2. The process as set forth in claim 1 wherein said sufficient temperature to convert the fibers into boron nitride is from 700° to 1100° C.

3. The process as set forth in claim 1 wherein the step of passing said mat through a needler increases the density of said mat by about 300 to 400%.

4. The process as set forth in claim 1 wherein said needler comprises:
   a first plate;
   a second plate spaced apart from, and oriented generally parallel to, said first plate;
   means for varying the spacing between said plates; and
   a first array of needles attached perpendicularly to the inwardly facing surface of said first plate, each needle having a maximum diameter of 16 gauge and being separated from adjacent needles by 0.01 to 1 inch.

5. The process as set forth in claim 4 wherein said needler further comprises:
   a second array of needles attached perpendicularly to the inwardly facing surface of said second plate, each needle having a maximum diameter of 16 gauge and being separated from adjacent needles by 0.01 to 1 inch, the needles of said second array being displaced laterally from the needles of said first array whereby the needles of said second array are positioned opposite the spaces between the needles of said first array.

6. The process as set forth in claim 4 wherein said mat passes through said needler 0.22 inch at a time.

7. A process for producing a non-woven, mechanically intertwined boron nitride fiber mat, comprising the steps of:
   centrifugally spinning molten boron oxide into strands;
   attenuating said strands with a gas stream into fibers;
   compacting said fibers into a mat;
   heating said mat in an anhydrous ammonia atmosphere at a sufficient temperature and for a sufficient time to convert boron oxide in the fibers into boron nitride; and
   passing said mat of boron nitride fibers through a needler to reorient and intertwine said fibers.

8. The process as set forth in claim 7 wherein said sufficient temperature to convert the fibers into boron nitride is from 700° to 1100° C.

9. The process as set forth in claim 7 wherein the step of passing said mat through a needler increases the density of said mat by about 300 to 400%.

10. The process as set forth in claim 7 wherein said needler comprises:
   a first plate;
   a second plate spaced apart from, and oriented generally parallel to, said first plate;
   means for varying the spacing between said plates; and
   a first array of needles attached perpendicularly to the inwardly facing surface of said first plate, each needle having a maximum diameter of 16 gauge and being separated from adjacent needles by 0.01 to 1 inch.

11. The process as set forth in claim 10 wherein said needler further comprises:
   a second array of needles attached perpendicularly to the inwardly facing surface of said second plate, each needle having a maximum diameter of 16 gauge and being separated from adjacent needles by 0.01 to 1 inch, the needles of said second array being displaced laterally from the needles of said first array whereby the needles of said second array are positioned opposite the spaces between the needles of said first array.

12. The process as set forth in claim 10 wherein said mat passes through said needler 0.22 inch at a time.

* * * * *